(No Model.) 5 Sheets—Sheet 2.
T. B. BOWERS.
APPARATUS FOR SEPARATING VEGETABLE FROM ANIMAL FIBER.
No. 339,964. Patented Apr. 13, 1886.
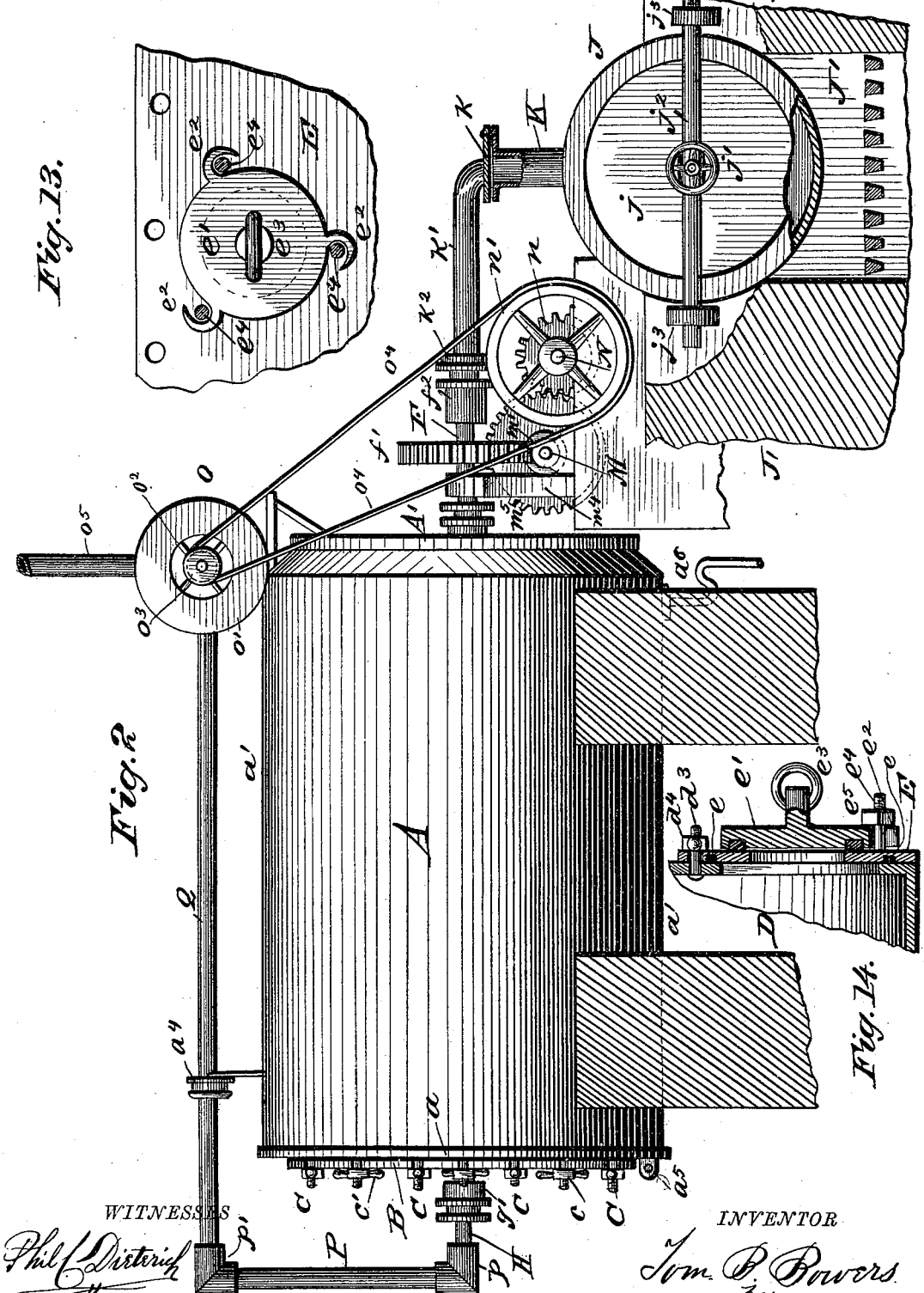
WITNESSES
Phil J. Dietrich
A. E. Sowell
INVENTOR
Tom. B. Bowers
by:
W. S. Alexander
Attorney

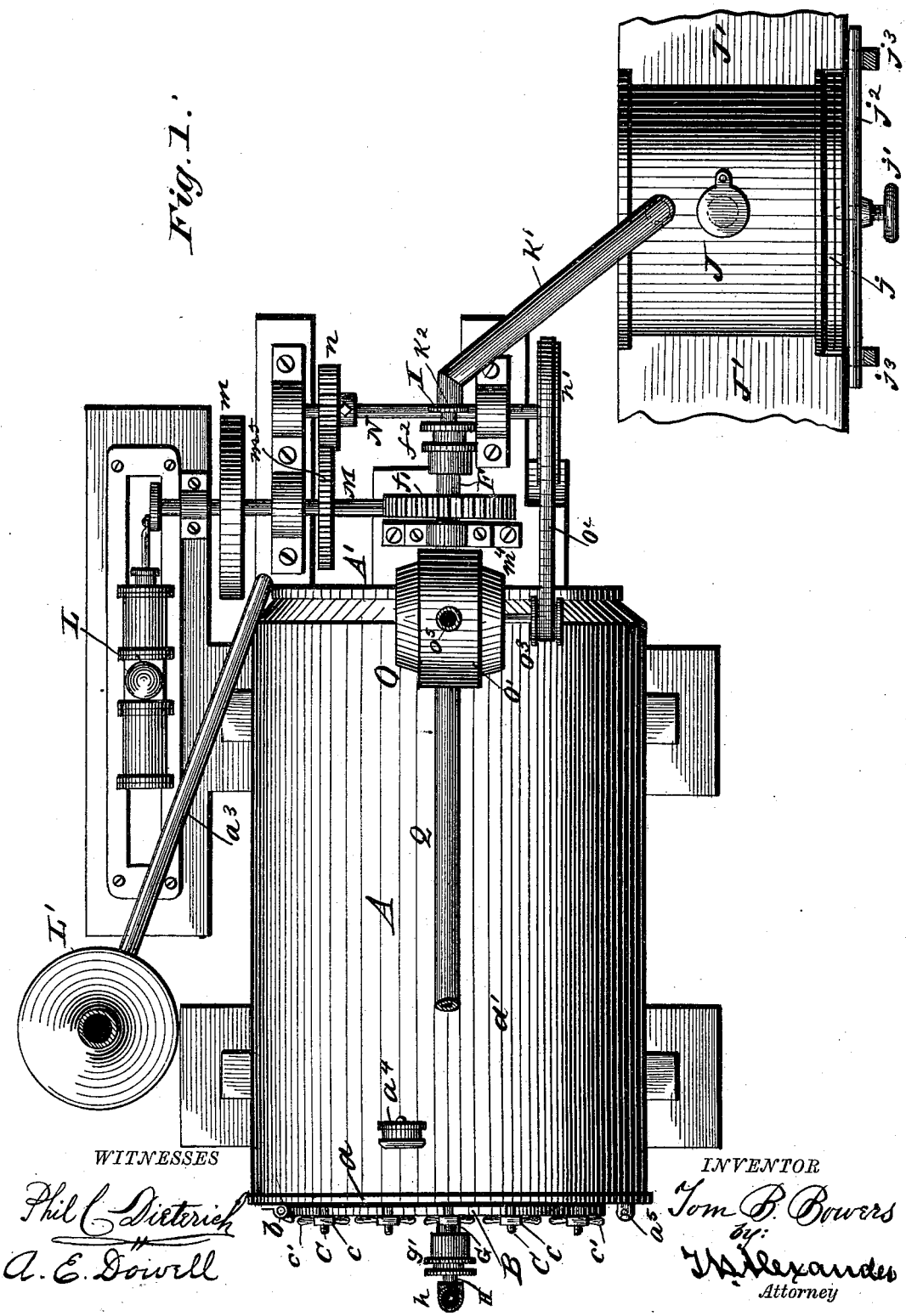

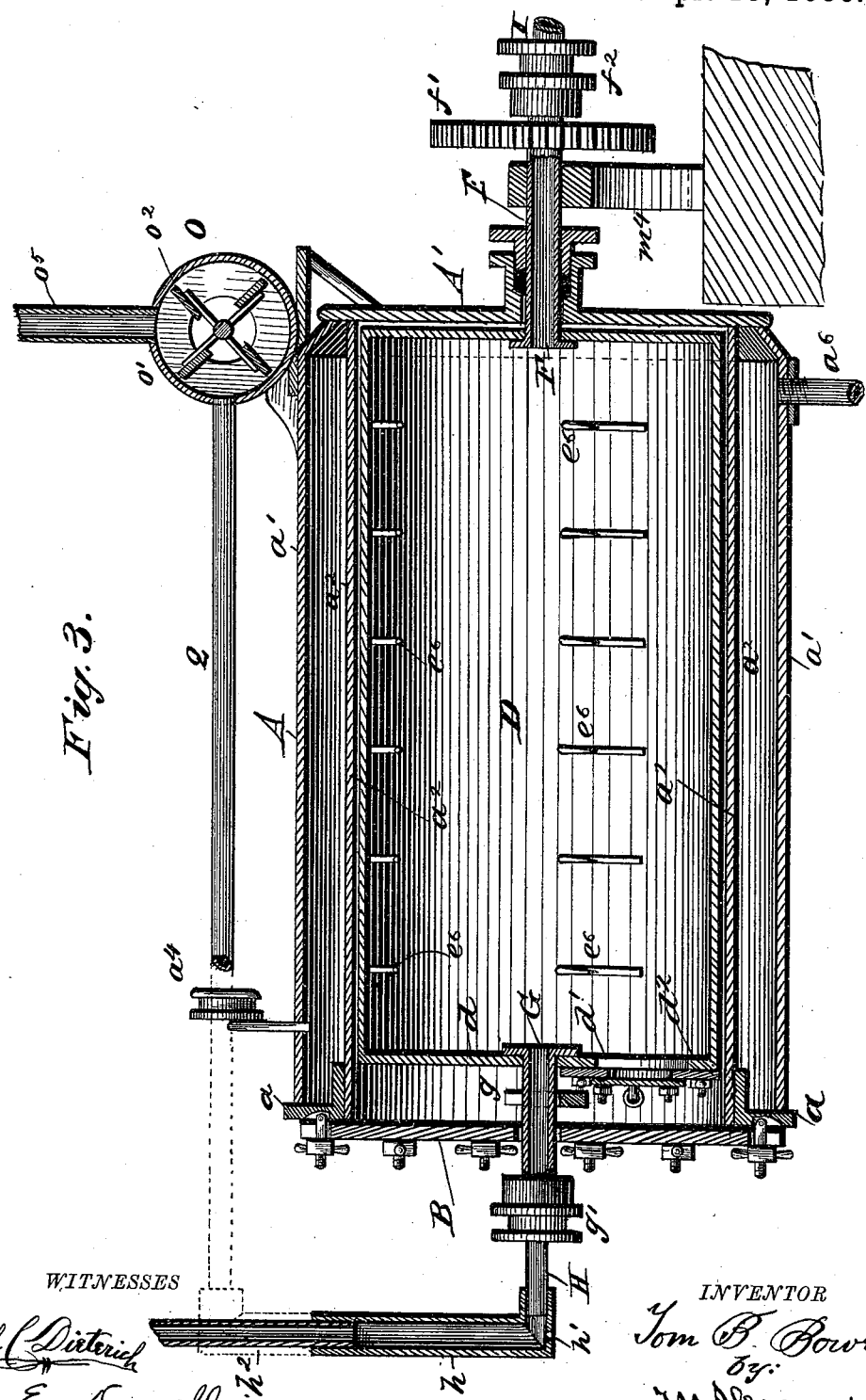

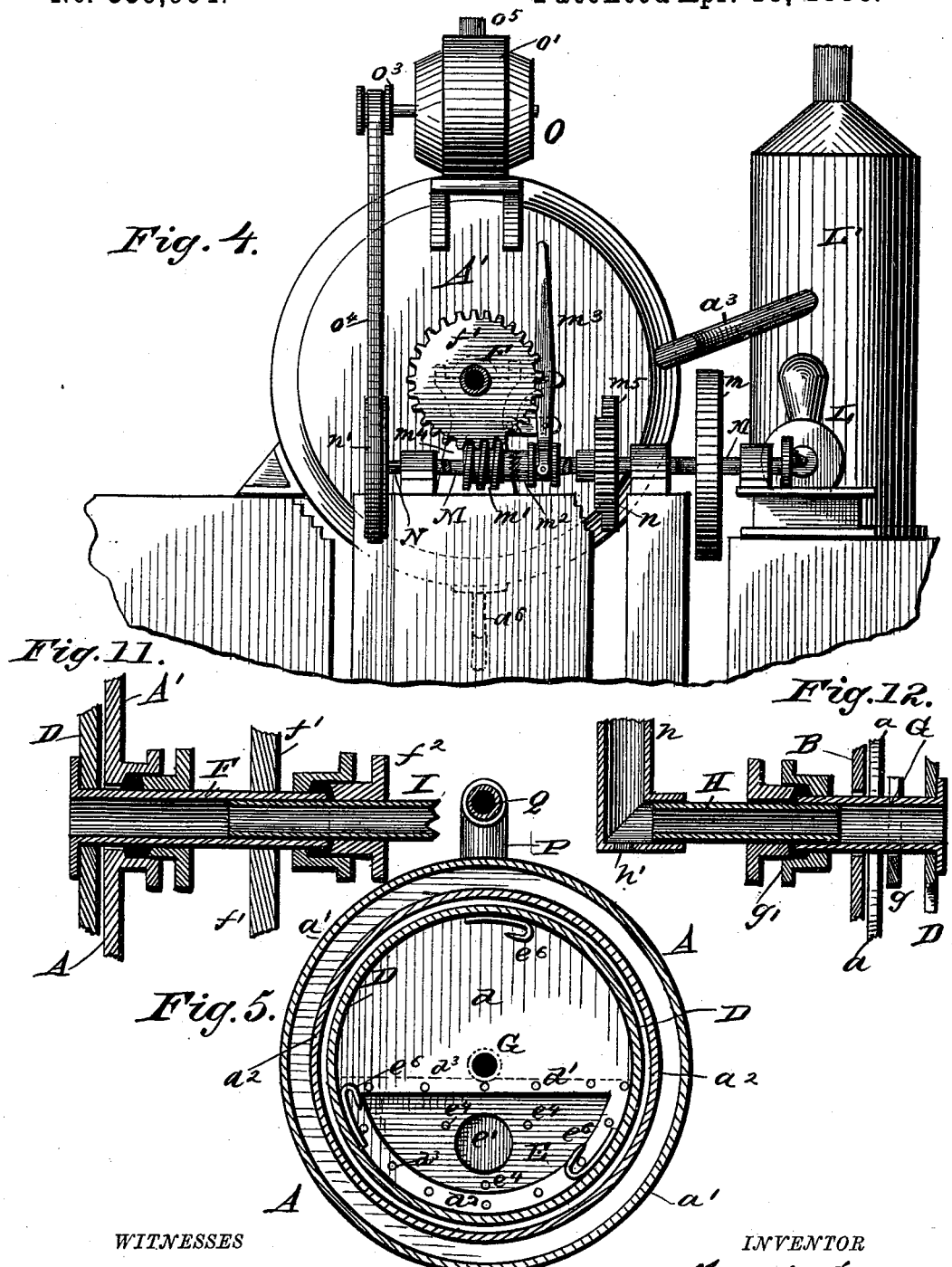

(No Model.) 5 Sheets—Sheet 5.
T. B. BOWERS.
APPARATUS FOR SEPARATING VEGETABLE FROM ANIMAL FIBER.
No. 339,964. Patented Apr. 13, 1886.
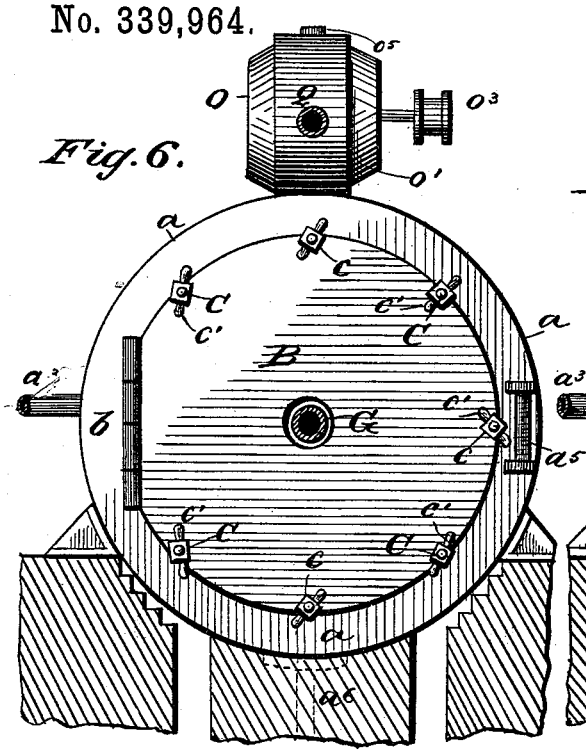
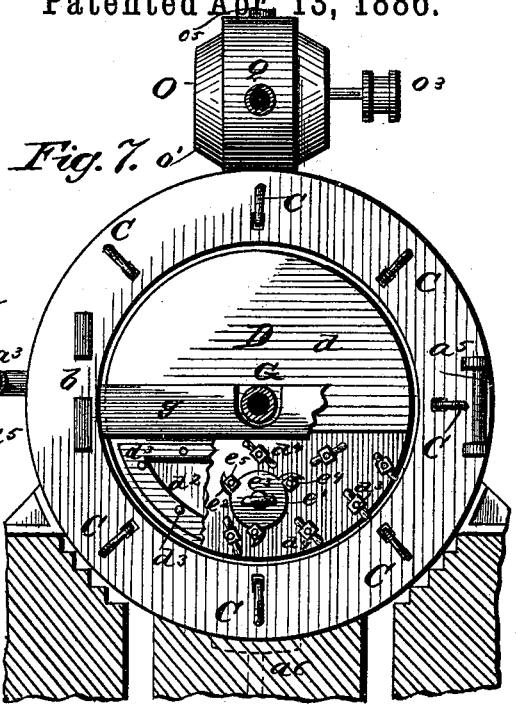
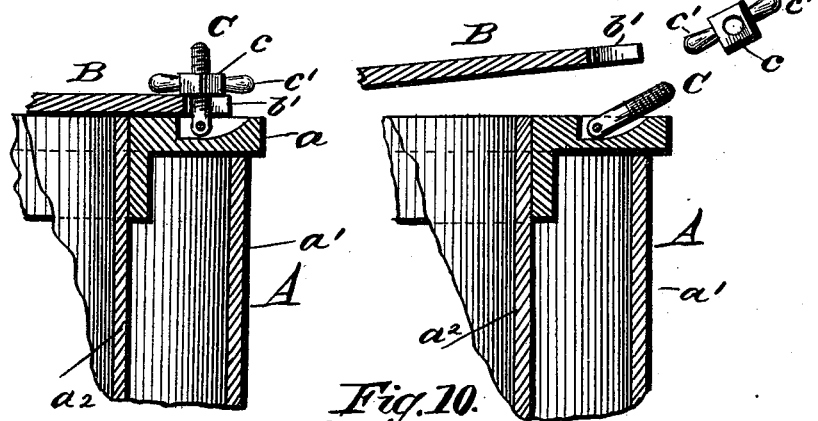
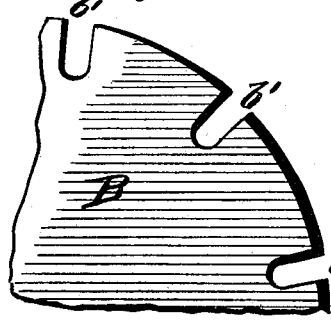
WITNESSES
Phil C. Dietrich
A. E. Dowell
INVENTOR
Tom B. Bowers
by
J. W. Alexander
Attorney

UNITED STATES PATENT OFFICE.

TOM B. BOWERS, OF CHESTER, PENNSYLVANIA.

APPARATUS FOR SEPARATING VEGETABLE FROM ANIMAL FIBER.

SPECIFICATION forming part of Letters Patent No. 339,964, dated April 13, 1886.

Application filed January 30, 1886. Serial No. 190,380. (No model.)

*To all whom it may concern:*

Be it known that I, TOM B. BOWERS, of Chester, in the county of Delaware and State of Pennsylvania, have invented certain new and useful Improvements in Apparatus for Separating Vegetable from Animal Fiber; and I do hereby declare that the following is a full, clear, and exact description thereof, reference being had to the accompanying drawings, and to the letters of reference marked thereon, which form part of this specification, in which—

Figure 1 is a top plan view of the complete apparatus. Fig. 2 is a side elevation of the same, partly in section. Fig. 3 is a vertical central section of the same. Fig. 4 is an end elevation. Fig. 5 is a transverse section of the cylinder and steam-jacket. Fig. 6 is a front elevation of the machine. Fig. 7 is a similar view, with the door B removed. Figs. 8, 9, and 10 represent detail views of the door. Figs. 11 and 12 represent detail sectional views of the pipes F and G and their attachments. Figs. 13 and 14 are detail views of the cylinder D and its door.

This invention relates to improvements in mechanism for removing, by the aid of acid and salt, the vegetable fiber (such as cotton or linen) from cloth or rags made partly of wool and partly of such fiber, or for removing burrs and other loose vegetable matter from loose wool; and it consists in the construction and novel arrangement of parts hereinafter described, and pointed out in the appended claims.

Referring to the accompanying drawings, A designates a cylindrical steam-jacket having the closed end A′, the other end open, the outer shell, $a′$, and the inner shell, $a^2$.

$a$ is a ring-shaped re-enforcing plate, which is secured to the open or front end of the cylinder, and extending within the shell $a^2$, so as to form a flange.

$a^3$ is the steam-pipe, entering the jacket at or near its rear end, and conducting steam thereto from the boiler of the steam-engine that rotates the cylinder.

$a^4$ is a pressure-gage of ordinary construction, which passes through the outer shell of the jacket near the front end of the same, and $a^5$ is a thermometer passing into the space within the jacket through the plate $a$.

$a^6$ is a drip-pipe provided with a trap, as shown. By means of this pipe, which is situated near the front end of the machine, the water of condensation passes from the jacket. The said jacket is secured and supported horizontally in a proper foundation, preferably of brick-work, as shown in the drawings.

B is a door hinged at $b$ upon the plate $a$, and overlying the said plate for a considerable distance. The door B has in its edge a number of notches, $b′$ $b′$.

C C are bolts, which are pivoted upon the plate $a$ at points corresponding to said notches and in such manner that they can be turned readily into and out of the same. The bolts fit snugly, but not tightly, in the notches, and have on their outer threaded ends the nuts $c$, provided with the handles $c′$, as shown, so that they can be turned easily on the bolts. To close the door, the bolts are turned into the notches, and the nuts turned inward until the door impinges against the plate firmly. To open the door, the nuts are turned outward far enough to allow the bolts to be turned out of the notches.

D is the cylinder to contain the material to be operated upon. The cylinder has its end adjacent to the closed end of the jacket also closed. The opposite end of the cylinder is closed for rather more than half its area by a plate, $d$, the straight inner edge of which forms with the diameter of the end of the cylinder parallel thereto a space, $d′$, on the plate.

$d^2$ is an inward-standing flange around the outer curved edge of the open part of the end of the cylinder.

$d^3$ $d^3$ are bolts secured at equidistant intervals into the flange $d^2$ and space $d′$, and $d^4$ $d^4$ are nuts screwing upon the outer ends of said bolts, which have their ends threaded. These nuts have handles, as shown, so as to be easily turned on the bolts.

E is the door of the cylinder. The edges of said door, when in place, correspond with the outer edges of the flange $d^2$ and space $d′$.

$e$ is a recess or rabbet around the edges of the door in its inner surface. The door is provided with openings at intervals corresponding with the bolts $d^3$ on the flange $d^2$ and space $d′$. To close the door, the bolts are passed through said openings, the rabbet $e$ filled with proper packing, preferably asbestus paper, and the nuts $d^4$ are turned inward until the door impinges firmly on the flange $d^2$ and space $d'$. The asbestus packing makes the joint steam or air tight.

$e'$ is a small circular door covering an opening in the center of the door E. The door has at equidistant intervals around its edge the curved or hook-shaped extensions $e^2$, and is rabbeted around its edge to receive proper packing.

$e^3$ is a handle secured centrally to the door $e'$, and $e^4$ $e^4$ are the equidistant bolts standing out from the door E, adjacent to the edge of the door $e'$. To close the door, it is turned by its handle in the direction to cause the hook-shaped extensions to hug or partially surround the bolts, and nuts $e^5$ are then screwed down firmly on said projections. The door can by these means be opened and closed very quickly.

F is a tubular shaft secured centrally to and opening through the closed end of the cylinder. The said shaft passes through central openings in the closed end of the jacket, which end has an inner and an outer plate.

$e^6$ $e^6$ are three equidistant longitudinal lines of hooks on the inside of the cylinder. The hooks stand inward and then curve upward and outward. The cylinder rotates in the direction to cause the hooks to lift the material and carry it upward to a considerable height, thus increasing the agitation it receives.

$f$ is a bearing for the shaft F, which bearing is supported by and rises from the foundation of the apparatus.

$f'$ is a gear-wheel on the shaft outside of said bearing, and $f^2$ is a stuffing-box packed, preferably, with asbestus on the ends of the shaft. The functions of said wheel and stuffing-box are hereinafter explained.

G is a tubular shaft similar to the shaft F, and standing out from the plate $d$ at a point corresponding with the axis of the cylinder. The shaft is supported by a bearing made in a bar, $g$, which crosses diametrically the inside of the jacket just within its front end.

$g'$ is a stuffing-box on the end of the shaft G, and having a function hereinafter explained.

H is a short tube passing through the shaft G and the stuffing-box $g'$, extending somewhat outside of the latter and making a steam-tight joint therewith.

$h$ is a section of pipe having on its lower end an elbow, which slips over the extension of the tube H.

$h'$ is an opening in the lower surface of the elbow below the pipe $h$.

$h^2$ is a section of pipe secured permanently in position and passing through the roof of the building in which the machine is situated. The lower end of the section $h^2$ slips into the upper end of the section $h$ when the parts are in position.

I is a short tube similar to the tube H, and passing through the shaft F and stuffing-box $f^2$, forming a steam-tight joint therewith and extending a short distance outward therefrom. The said tube connects with the retort of the sulphuric acid, as hereinafter described.

J is the retort, of cylindrical shape, and secured above the furnace J', as shown. The retort is closed at both ends, but is provided on one with the circular door $j$. The said door has a flange around its outer edge, which, when the door enters a circular opening in the side of the retort, lies against the outer surface thereof. The door is secured in place by means of the screw $j'$, which has a proper hand-wheel or handle on its outer end, and passes through the bar $j^2$. The said bar slips through openings in the lugs $j^3$ $j^3$, which stand out from the side of the retort on each side of the door. The inner end of the screw $j'$ impinges upon the center of the door, and thereby gives equal pressure to all parts thereof.

K is the feeding-tube of the retort, rising from the top thereof and provided with an outstanding flange around its upper end.

$k$ is a circular door pivoted near its edge upon the said flange, so that it can be slid from off the top of the tube when it is necessary to charge the retort or stir the material therein, and then slid back to close the tube after charging.

$k'$ is a tube rising from the top of the retort to a proper height and then bending horizontally, so as to slide upon the extension of the short tube I until its flange $k^2$ comes in contact with the stuffing-box $f^2$.

The salt and acid are introduced into the retort in the proportion of about two parts of the former to one of the latter, and the fire started in the furnace J'. The heat is then kept constant at a point that will volatilize the acid. As the acid and salt escape, additional but smaller charges in the same proportions are added at stated intervals. As the volatilized acid and salt pass through the rotating cylinder, they come in contact with the material therein and destroy the vegetable fiber of the same. They then pass out of the cylinder through the short tube H and sections $h$ $h^2$, and ascend above the roof of the building. The said sections act as chimneys and cause an outdraft from the cylinder, so that no blower is necessary during this part of the operation. The packed doors of the cylinder and the stuffing-boxes prevent any acid from leaking into the inside of the steam-jacket and ruining the same.

L is the engine, from the boiler L' of which the steam-pipe to the jacket runs, and which rotates the cylinder and actuates the fan hereinafter described.

The mechanism for rotating the cylinder is as follows:

M is a transverse horizontal shaft situated to the rear of the machine and journaled in bearings formed on supports secured to the foundation of the machine, as shown. The shaft M is driven by the engine L by means of a crank and connecting-rod, and is preferably situated on the left side of the machine. $m$ is the fly-wheel on the shaft, and $m'$ a worm on the same, which meshes with the gear-wheel $f'$, and thereby rotates the cylinder D. This shaft is in two parts, which may be coupled and uncoupled by means of the clutch $m^2$, actuated by the lever-handle $m^3$, the forked lower arm of which engages the groove on the outer division of the clutch, which division is splined and slides on the shaft. The lever-handle is pivoted on the lateral arm of a standard-frame, $m^4$, which rises from the foundation. By means of the clutch the rotation of the cylinder may be stopped at will.

$m^5$ is a gear-wheel on the outer division of the shaft M, which gear-wheel meshes with a gear-wheel, $n$, splined and movable on a shaft, N, parallel to the shaft M, and turning in bearings made on supports rising from the foundation. The gear-wheel $n$ may be moved to one side and fixed in position by a set-screw so as to disengage from the gear-wheel $m^5$. The shaft N then ceases to be rotated by the shaft M.

$n'$ is a large pulley on the inner end of the shaft N, the purpose of which pulley is hereinafter explained.

O is a blower bolted to a platform, $o$, secured to top of the jacket and projecting from its rear end, and $o'$ is the cylindrical casing thereof.

$o^2$ is the fan of the blower, having its shaft journaled in said casing, and $o^3$ is a small pulley on the end of the fan-shaft.

$o^4$ is a band connecting the pulleys $o^3$ and $n^2$, and driving the fan from the latter. The rotation of the fan may be stopped by moving the gear-wheel $n$ to disengage from the gear-wheel $m^5$. This is necessary, as the fan is not used during the operation proper, as is hereinafter explained. The blower creates a blast upward through a vertical pipe, $o^5$, which runs from its casing up through the roof. The said pipe is secured permanently in place.

In using the blower the pipe $h$ is disengaged from the tube H and pipe $h^2$, and a pipe, P, having elbows $p$ $p'$ at each end, respectively, is substituted. The pipe P is of such length that when the elbow $p$ is engaged or coupled to the tube H the elbow $p'$ is just above the top of the steam-jacket.

Q is a section of pipe which connects the elbow $p'$ with the casing of the blower. Thus when the blower rotates, creating a blast upward through the pipe $o^4$, the air is drawn into its casing through the tube H and pipes P and Q.

The whole operation of the machine is then as follows: The gear-wheels $m^5$ and $n$ being disengaged so that the blower will not act, the cylinder is rotated by the described mechanism, and the machine being put in operation, as described, the volatilized acid rising through the pipe $h^2$ above the roof, all acid that may condense in said tube will pass down into the pipe $h$ and will fall through the opening $h'$ therein into some proper vessel placed to receive it. When it is thought that the material in the cylinder has been thoroughly treated, the rotation of the cylinder is stopped, the pipe $h$ is removed, the door B opened, (the pipe $h$ being long enough to permit this,) and the small door $e'$ opened and a sample taken out. If the process is not complete, replace the parts and proceed as before. If complete, close the doors and put the pipes P and Q in position, instead of replacing the pipe $h$. Then engage the gear-wheels $m^5$ and $n$, so that the blower will be set in motion. The blower creates a very strong blast through the cylinder, so that the same will be cleared of all residual acid and refuse matter, and all dampness that may be in the stock is drawn out. When thoroughly dry, the vegetable matter will become dust. The gases have free passage from the retort into the cylinder and thence up the pipes to a point above the roof, so that none escapes into the room. The gases cannot escape into the interior of the steam-jacket and corrode or injure the interior shell of the same.

Having described my invention, I claim—

1. In a machine to remove vegetable fiber from wool by means of acid and salt, the combination of the cylindrical steam-jacket, the rotating cylinder having the tubular shafts secured to its ends, the stuffing-boxes on the ends of the tubular shafts, the retort, and the short tubes running through the tubular shafts and serving to conduct the volatilized acid into and out of the cylinder, substantially as specified.

2. In a machine to remove vegetable fiber from wool by means of acid and salt, the combination of the cylindrical steam-jacket, the closed cylinder having a door at the front end, the tubular shafts secured to the ends of the cylinder, mechanism, substantially as described, to rotate said cylinder, the retort, the short tubes passing through the tubular shafts and conducting the volatilized acid into and out of the cylinder, and the vertical tubes to create a draft from the cylinder, substantially as specified.

3. In a machine to remove vegetable fiber from wool by means of acid and salt, the combination of the cylindrical steam-jacket, the cylinder rotating therein and having the tubular shafts secured to its ends, the blower, the retort, the short tubes passing through the tubular shafts, the tubing connecting the blower to the front short shaft, and mechanism, substantially as specified, whereby the cylinder may be rotated independently, or the cylinder and blower rotated simultaneously, substantially as specified.

4. In a machine for removing vegetable fiber from wool by means of acid and salt, the combination, with the steam-jacket, the cylinder rotating therein, discharging apparatus, substantially as described, secured to the front of the cylinder, tubular shaft F, and stuffing-box $f^2$, of the short tube I and cylindrical retort J, provided with the bent tube $k'$, to connect to the tube I, and the feeding-tube K, having upon its flanged upper end the pivoted door $k$, substantially as specified.

5. In a machine to separate vegetable fiber from wool by means of acid and salt, the combination, with the retort and cylinder rotating within the steam-jacket and provided with the door E, of the bolts $e^4$, secured to said door, door $e'$, provided with the curved extensions $e^2$ and handle $e^3$, and the nuts $e^5$, substantially as specified.

6. In a machine for the purpose described, the combination, with the steam-jacket provided at its open end with the circular plate $a$, of the bolts C, pivoted upon said plate, the hinged door B, provided with the notches $b'$, and the nuts $c$, substantially as specified.

7. In a machine for the purpose specified, the combination, with the cylinder rotating within the steam-jacket, the blower, the retort, the tubing connecting the retort and cylinder, and the discharge tubing, substantially as described, of the gear-wheel $f'$ on the tubular shaft E, the shaft M, driven by the engine by means of a crank and connecting-rod and provided with the worm $m$, gear-wheel $m^5$, and clutch $m^2$, actuated by the lever $m^3$, the shaft N, provided with the gear-wheel $n$ and pulley $n'$, fan $o^2$ of the blower, pulley $o^3$ on the end of the fan-shaft, and belt $o^4$, connecting the pulleys $o^3$ and $n$, all constructed and arranged substantially as and for the purpose specified.

In testimony that I claim the foregoing as my own I affix my signature in presence of two witnesses.

TOM B. BOWERS.

Witnesses:
CHAS. H. BOWERS,
HENRY L. BROOMALL.